Patented Jan. 26, 1943

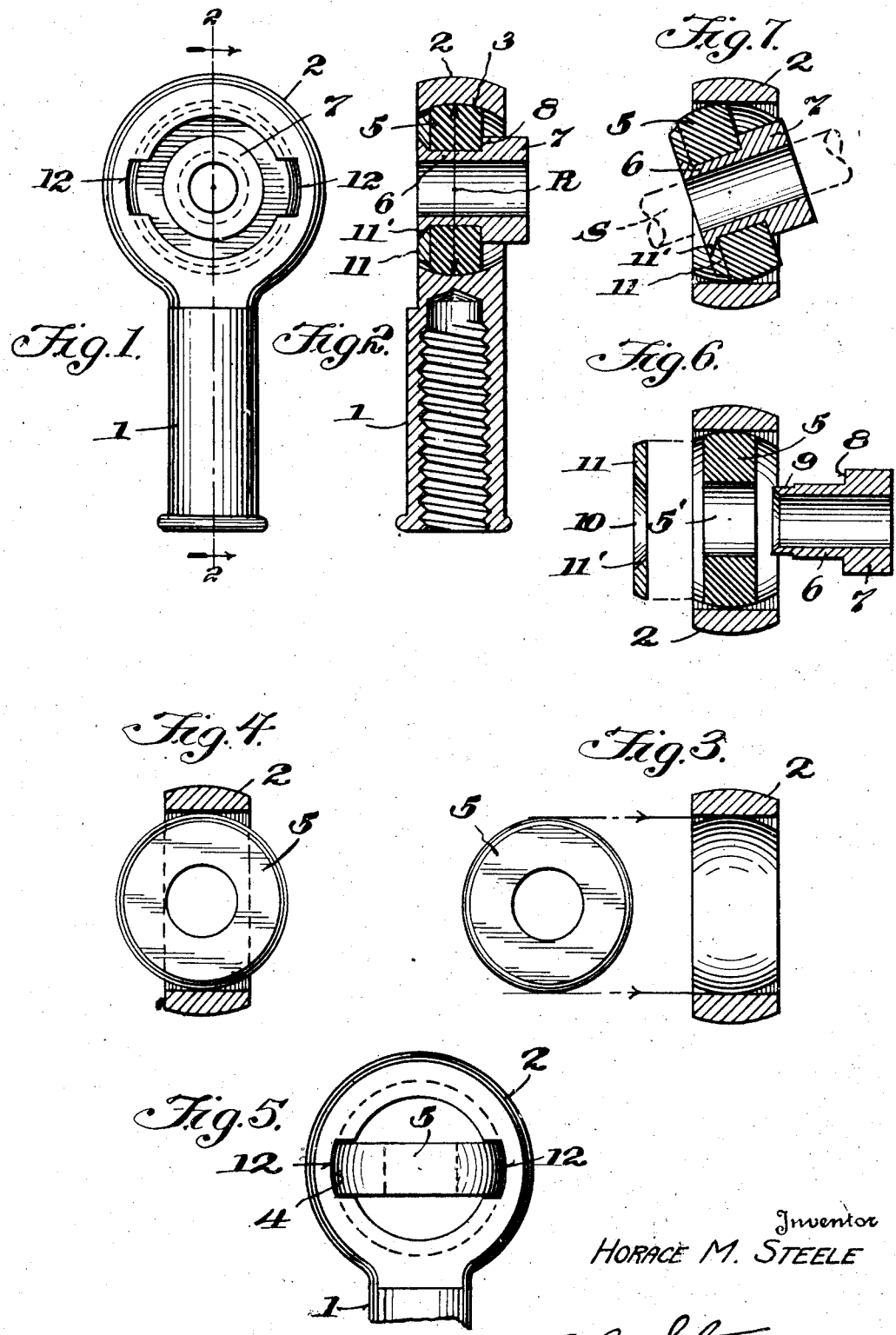

2,309,281

UNITED STATES PATENT OFFICE 2,309,281

ROD END CONNECTION

Horace M. Steele, Dayton, Ohio, assignor to United Aircraft Products, Inc., Dayton, Ohio, a corporation of Ohio Application January 27, 1942, Serial No. 428,407

5 Claims. (Cl. 287—88)

This invention relates to rod end connections and more particularly to that type of rod end connection wherein the rods are rotatable relative to each other and each rod and its shaft carrying bearing are related so that a relative angular movement, for example, 30 degrees between the rods is provided.

The primary object of the invention is to provide a device of this character wherein the bearing member to which the shaft is connected can be easily and quickly connected to the retainer ring or cage that is carried by the rod.

A further object of the invention is to provide a retainer ring or cage, the inner circumference of which forms a one-piece or integral race or raceway for the bearing of the shaft.

A still further object of the invention is to provide a device of this type which is composed of a minimum of parts, that are of simple construction and that can be economically produced.

A still further object of the invention is to provide a device of this type in which the parts can be easily and quickly disassembled.

A still further object of the invention is to provide a device of this type wherein the parts are compactly assembled and occupy a minimum of space, while still retaining all of the foregoing recited objectives.

The invention has still further and other objectives which will be later set forth and of themselves manifested in the course of the following description.

In the drawing:

Fig. 1 is a side elevation of the invention with the parts in assembled form;

Fig. 2 is a section on line 2—2 of Fig. 1;

Fig. 3 is a view showing the retaining ring or cage in section with the bearing in side elevation, and in the position which it initially occupies in inserting same into the ring;

Fig. 4 is a view similar to Fig. 3, showing the bearing within the retaining ring;

Fig. 5 is a side elevation showing the bearing in its initial assembled position in the ring;

Fig. 6 is a vertical sectional view of the invention showing the bearing in its assembled form within the retaining ring, with the shaft receiving member and the securing plate therefor in position prior to final assemblage; and Fig. 7 is a sectional view showing the extent of movement in one direction of the bearing member and the shaft, the latter shown in dotted lines.

In accordance with the present invention a socket member 1 is provided, which may be internally threaded as shown for securement to the end of a rod. However, any other means for securement of the socket member to the rod may be utilized, since the means of securement forms no part of the present invention. The socket member at its outer end is formed with a cage or retaining ring 2, which has an annular transversely curved or concave internal bearing surface 3, which is engaged with a correspondingly curved or convex bearing surface 4 of a bearing 5.

The radii R of the bearing surface of the cage or retaining ring and the periphery of the bearing are both generated from the same point, but with the radius of the bearing surface of the cage approximately .002" greater in length than the radius of the periphery of the bearing.

The bearing 5 is of disk-like formation and has a central aperture 5' to receive therethrough one end of a collar 6. The collar at its opposite end is flanged or enlarged as indicated at 7, and the shoulder 8 resultant from the enlargement abuts the adjacent side face of the bearing 5.

The opposite end of the collar 6 is reduced in diameter as indicated at 9 and extends through the aperture 10 of a retaining plate 11. The wall defining the opening 10 of the plate is bevelled as indicated at 11'. The parts thus far described are assembled by inserting the collar through the aperture 5' of the bearing 5; the plate 11 is then placed upon the collar and the reduced end of the latter is then peened or swaged outwardly to engage against the bevelled wall 11' of the plate 11 whereby to secure the bearing on the collar against movements axially of the latter, and with the peened or swaged portion lying flush with the outer face of the plate.

By referring to Figs. 1 and 5 it will be observed that the cage, or retaining ring 2 is formed with a pair of diametrically opposed slots 12 which latter are of a width to receive the bearing 5 therein.

In assembly of the entire structure, the bearing member 5 is disposed with its sides at right angles to the side faces of the retaining ring 2, in the position shown in Fig. 5, wherein the member 5 is alined with the slots 12, of the cage, following which the bearing is moved through the slots until the bearing member is in a position centrally within the cage or retaining ring 2, as depicted in Fig. 4. The bearing member is then rotated throughout 90 degrees, whereby to dispose same within the ring in the position depicted in Figs. 2, 4 and 6. Then the collar is applied by passing the reduced end 9 thereof through the aperture 5' of the bearing member, and finally the retaining plate 11 is mounted on the reduced end 9, and the latter peened to engage the plate so that the parts are assembled in the position depicted in Figs. 2 and 7.

It will thus be seen that the invention provides an easy and quick manner of assemblage of the bearing member within the retaining ring and the application thereto of the collar and its retaining plate.

The shaft S, shown in dotted lines, is received within the interior of the collar and is permitted, in addition to rotative movement, angular movement of approximately 30 degrees as shown in Fig. 7. It will furthermore be apparent that with the instant invention the bearing surface for the bearing member is integral, and forms a one-piece race for the shaft carrying bearing.

The invention eliminates the use of a filler or fill-in pieces, and also lubricating means, since the bearing is preferably formed of self-lubricating metal, and the resultant structure is one that is possessed of a minimum of parts, compactly assembled.

With the parts in their assembled form it will be apparent that the collar and the retaining plate also prevent disengagement of the bearing member from the cage by virtue of engagement with the latter so that the parts cannot be disassembled without removal of the plate and the collar.

It is to be understood that the form of the invention herein shown and described is to be taken as a preferred example, of the invention, and that various changes in the shape, size and arrangement of parts may be resorted to without departing from the spirit of the invention or the scope of the sub-joined claims.

I claim:

1. A rod connector or the like for use with a rigid retaining ring formed to be secured to a rod end and which has an annular transversely concave bearing surface formed with a pair of diametrically opposed slots each of which extends across the bearing surface to receive a centrally apertured disk-like bearing having a convex bearing surface of a thickness to be moved into the slots and of a diameter to provide for turning of the bearing when in the ring so that its convex bearing surface engages the concave bearing surface of the ring, said connector comprising a rod engaging collar received through the aperture of the disk-like bearing and having a flange at one end thereof, said flange being of a diameter to abut one side face of the rigid retaining ring to prevent tilting of the disk-like bearing and thereby removal of the latter from the retaining ring, and means on the opposite end of the collar to secure the same to the disk-like bearing.

2. In a rod connector or the like, a rigid retaining ring for securement to a rod end, said ring having an annular transversely concave bearing surface formed with a pair of diametrically opposed slots each of which extends entirely across the bearing surface and the distance between the end walls of the slots being materially greater than the internal diameter of the concave bearing surface, a centrally apertured disk-like bearing having a convex bearing surface and of a thickness to be moved into the slots and of a diameter to provide for turning of the bearing when in the ring so that its convex bearing surface engages the concave bearing surface of the ring, the walls of said slots extending through the side faces of the ring, whereby the disk-like bearing can be inserted from either side of said retaining ring, means for connecting a second rod to said disk-like bearing comprising a rod engaging collar received through the aperture of the bearing and having a flange at one end thereof abutting one side face of the bearing, and means on the opposite end of the collar to secure the collar to the bearing so that the flange on said collar abuts the edge of said ring to prevent separation of said bearing elements during relative tilting movements of the latter.

3. A rod connector or the like for use with a rigid retaining ring formed to be secured to a rod end and which has an annular transversely concave bearing surface formed with a pair of diametrically opposed slots each of which extends across the bearing surface to receive a centrally apertured disk-like bearing having a convex bearing surface of a thickness to be moved into the slots and of a diameter to provide for turning of the bearing when in the ring so that its convex bearing surface engages the concave bearing surface of the ring, said connector comprising a rod engaging collar received through the aperture of the disk-like bearing and having a part formed to engage one side face of the ring to prevent tilting of the disk-like bearing and thereby removal of the latter from the ring, and means to secure the collar to the disk-like bearing member.

4. A rod connector or the like for use with a rigid retaining ring formed to be secured to a rod end and which has an annular transversely concave bearing surface formed with a pair of diametrically opposed slots each of which extends across the bearing surface to receive a centrally apertured disk-like bearing having a convex bearing surface of a thickness to be moved into the slots and of a diameter to provide for turning of the bearing when in the ring so that its convex bearing surface engages the concave bearing surface of the ring, said connector including a member formed to have a rod attached thereto, connected to the disk-like bearing and extending outwardly beyond at least one of the radial faces of said disk-like bearing a distance sufficient to engage a side face of the ring during relative tilting movements of the ring and bearing so as to prevent separation thereof.

5. A rod connector or the like for use with a rigid retaining ring formed to be secured to a rod end and which has an annular transversely concave bearing surface formed with a pair of diametrically opposed slots each of which extends across the bearing surface to receive a centrally apertured disk-like bearing having a convex bearing surface of a thickness to be moved into the slots and of a diameter to provide for turning of the bearing when in the ring so that its convex bearing surface engages the concave bearing surface of the ring, said connector including a member connected to and extending outwardly beyond at least one of the radial faces of the disk-like bearing a distance sufficient to engage a side of the ring upon attempted rotation of the bearing to a position perpendicular to the ring, whereby to prevent separation of the ring and bearing.

HORACE M. STEELE.